United States Patent [19]

Filo

[11] Patent Number: 5,321,263
[45] Date of Patent: Jun. 14, 1994

[54] RECORDING TARGET

[75] Inventor: Andrew S. Filo, Cupertino, Calif.

[73] Assignee: Simon Marketing, Inc., Los Angeles, Calif.

[21] Appl. No.: 60,770

[22] Filed: May 10, 1993

Related U.S. Application Data

[60] Continuation-in-part of Ser. No. 800,372, Nov. 29, 1991, which is a division of Ser. No. 598,266, Oct. 16, 1990, Pat. No. 5,151,595.

[51] Int. Cl.$^5$ .............................................. B42D 15/00
[52] U.S. Cl. .................................. 250/316.1; 250/271; 273/348.1; 434/16; 434/19; 434/21; 434/22; 434/23; 283/85; 283/903
[58] Field of Search ............................ 250/316.1, 271; 273/348.1, 371; 434/16, 19, 21, 22, 23; 283/85, 903

[56] References Cited

U.S. PATENT DOCUMENTS

| | | | |
|---|---|---|---|
| 2,254,717 | 9/1941 | Weiss | 95/72 |
| 2,813,043 | 11/1957 | Clark | 117/36 |
| 2,975,282 | 3/1961 | Schaffer | 250/65 |
| 3,073,234 | 1/1963 | Roganti | 95/75 |
| 3,092,004 | 6/1963 | Lewis | 95/73 |
| 3,295,430 | 1/1967 | Limberger | 95/73 |
| 3,418,149 | 12/1968 | Newman | 117/37 |
| 3,445,164 | 5/1969 | Browning | 355/82 |
| 3,508,344 | 4/1970 | Thomas | 35/9 |
| 3,617,324 | 11/1971 | Thomas | 117/1.7 |
| 3,784,394 | 1/1974 | Bildusas et al. | 117/1.7 |
| 3,793,025 | 2/1974 | Vrancken | 96/36 |
| 3,855,928 | 12/1974 | Kinney | 101/471 |
| 3,889,396 | 6/1975 | Aronson | 434/21 |
| 3,904,292 | 9/1975 | Ravich | 355/100 |
| 3,904,877 | 9/1975 | Hasegawa | 250/317 |
| 3,920,863 | 11/1975 | Fraik | 427/145 |
| 3,933,094 | 1/1976 | Murphy et al. | 101/426 |
| 3,944,422 | 3/1976 | Nihyakumen | 96/49 |
| 4,042,391 | 8/1977 | Fukutani | 96/47 |
| 4,049,843 | 9/1977 | Gaynor | 427/43 |
| 4,051,283 | 9/1977 | Thomas et al. | 428/29 |
| 4,109,937 | 8/1978 | Gager | 282/27.5 |
| 4,129,380 | 12/1978 | Fohl | 355/113 |
| 4,175,775 | 11/1979 | Kruegle | 283/7 |
| 4,176,277 | 11/1979 | Bricot | 250/316.1 |

(List continued on next page.)

FOREIGN PATENT DOCUMENTS 61-4362  1/1986  Japan ................................ 358/497

OTHER PUBLICATIONS

"Chromicolour UV Screen Ink", Matsui Shikiso Chemical Co., Ltd.
"Physical Nature of Light", Optics Source Book, Science Reference Series pp. 122–127.
"Measurement of Light", Optics Source Book, Science Reference Series pp. 344–345.
"Electromagnetic Waves And Photons", Schaum's Outline Series; Theory and Problems of Optics, Eugene Hecht pp. 24, 25, 27.
"Advanced Audio Response Technology", Brochure by RTC Industries, Chicago, Ill. 60623.

*Primary Examiner*—Jack I. Berman
*Attorney, Agent, or Firm*—Robbins, Berliner and Carson

[57] ABSTRACT

A recording target includes targeting information printed on a substrate offset from a visible target and masked from the weapon operator by a thermal clearing masking layer. The operator aims at the visible target and the simulated weapon applies a focussed pulse of intense visible light to the masked targeting information to reveal the relevant targeting information by being converted into infrared radiation, by the thermal clearing masking layer and/or a portion of the masked targeting information thereunder, which clears or renders transparent the portions of the thermal clearing masking layer illuminated by the focussed visible light.

50 Claims, 2 Drawing Sheets

U.S. PATENT DOCUMENTS

| | | | |
|---|---|---|---|
| 4,199,615 | 4/1980 | Wacks et al. | 427/43.1 |
| 4,202,491 | 5/1980 | Suzuki | 235/491 |
| 4,242,439 | 12/1980 | Izu et al. | 430/346 |
| 4,405,862 | 9/1983 | Bricot et al. | 250/318 |
| 4,408,121 | 10/1983 | Galatha | 235/494 |
| 4,452,843 | 6/1984 | Kaule et al. | 428/199 |
| 4,460,676 | 7/1984 | Fabel | 430/333 |
| 4,480,177 | 10/1984 | Allen | 235/379 |
| 4,519,632 | 5/1985 | Parkinson et al. | 283/75 |
| 4,525,412 | 6/1985 | Nakane et al. | 428/199 |
| 4,540,595 | 9/1985 | Acitelli et al. | 427/7 |
| 4,577,291 | 3/1986 | Cornet | 365/126 |
| 4,602,263 | 7/1986 | Borror et al. | 346/201 |
| 4,627,819 | 12/1986 | Burrows | 434/337 |
| 4,639,608 | 1/1987 | Kuroda | 250/578 |
| 4,650,320 | 3/1987 | Chapman et al. | 356/71 |
| 4,652,512 | 3/1987 | Ishida | 430/179 |
| 4,672,219 | 6/1987 | Iwabuchi et al. | 250/578 |
| 4,677,553 | 6/1987 | Roberts et al. | 364/412 |
| 4,684,998 | 8/1987 | Tanioka et al. | 358/293 |
| 4,711,830 | 12/1987 | Haruta et al. | 430/52 |
| 4,755,831 | 7/1988 | Sakamoto | 346/1.1 |
| 4,788,124 | 11/1988 | Wright | 430/138 |
| 4,790,565 | 12/1988 | Steed | 283/85 |
| 4,791,493 | 12/1988 | Ogura et al. | 258/294 |
| 4,832,341 | 5/1989 | Muller et al. | 273/139 |
| 4,850,618 | 7/1989 | Halladay, Jr. | 283/94 |
| 4,903,991 | 2/1990 | Wright | 283/95 |
| 4,927,180 | 5/1990 | Trundle et al. | 283/70 |
| 4,965,638 | 10/1990 | Hediger | 355/235 |
| 5,063,462 | 11/1991 | Nakagawa et al. | 358/475 |
| 5,151,595 | 9/1992 | Filo | 250/316.1 |
| 5,193,854 | 3/1993 | Borowski, Jr. et al. | 283/903 |

RECORDING TARGET

CROSS REFERENCE TO RELATED APPLICATION

This is a continuation-in-part of application Ser. No. 07/800,372 filed Nov. 29, 1991 which is a division of application Ser. No. 07/598,266 filed Oct. 16, 1990 and entitled "IMAGING DEVICE AND METHOD FOR DEVELOPING, DUPLICATING AND PRINTING GRAPHIC MEDIA" which issued on Sep. 29, 1992 as U.S. Pat. No. 5,151,595.

BACKGROUND OF THE INVENTION

1. Field of the Invention

This invention relates generally to the field of developing, printing and duplicating. More specifically, the invention relates to an imaging device and method for developing, printing and duplicating graphic media. In particular, the invention relates to techniques for determining and recording targeting information useful for weapon training and simulation as well as gaming.

2. Description of the Prior Art

Over the years, many different approaches have evolved for developing, printing and duplicating visible images on graphic media using ink, ribbons, recording paper and the like. Conventional recording papers include photographic papers in which light from an illuminated image is used in a single or multiple step process to create an image on the recording paper by chemical reaction.

Another type of recording paper is direct developing paper in which electrical, magnetic or thermal energy is used to create an image in a chemically pre-sensitized area. In thermal recording paper equipment such as facsimile devices, printers, and ink recorders, a heated wire is applied to thermally sensitive paper to form an image on the surface of the paper. The heat causes a chemical reaction in a coating on the paper, which produces a visible change.

There are also many approaches to thermographically reproducing images such as the use of non-drying inks dusted with a powdered compound and then fused by heating. Similarly, reflex or dual spectrum processes utilize an original copy of the image superimposed with a translucent sheet having a photosensitive coating not apparent to the unaided eye. Exposure to a brilliant light for several minutes causes the light to transmit through the translucent sheet, reflect off the original and alter the nature of the photosensitive coating. An opaque sheet having an infrared sensitive chemical coating is then positioned in contact with the translucent sheet. A second exposure, this time to infrared radiation, causes a chemical reaction in the infrared coating which reproduces the images on the opaque sheet.

Another thermographic reflex process utilizes an original superimposed first with a transfer sheet and then with a recording or copy sheet which is a transparent or translucent paper or plastic sheet. The recording sheet has an adhesive layer which is positioned on the transfer sheet. Direct exposure to infrared radiation softens the adhesive layer on the recording sheet. The radiation transmitted in large part through the recording sheet and completely by the transfer sheet, is absorbed by the images on the original sheet. The absorbed radiation on the original generates a heat pattern corresponding to the shape of the original images and the heat pattern is conducted back to the transfer sheet causing portions of the transfer layer to melt. The melted portions of the transfer layer are absorbed into the areas of the adhesive layer in contact with the transfer layer to form imaged areas in the adhesive layer which are legible as direct reading images.

Processes for determining and recording targeting information are used to determine and/or record the accuracy with which the weapon is aimed and fired at a target for training, simulation or gaming purposes. Targeting information processes may include compensation for field conditions such as wind, relative motion between the weapon and target as well as the projectile trajectory. In order to accurately include such compensation, targeting information processes for weapons have used actual or dummy projectiles fired at actual or dummy targets on actual or test firing ranges. Conventional processes for determining targeting information for simulated weapons, toys or other gaming purposes have used beams of light applied to light sensitive detectors or a raster scanning light producing image array, such as a video monitor, and a movable light sensor, such as a light pen.

Such conventional targeting information processes have used conventional approaches for developing, printing and duplicating visible images on graphic media to record the targeting information so determined.

A need exists for more convenient and cost effective targeting information techniques, including targets that may be illuminated during targeting or gaming with normal visible light and which provide convenient permanent or reversible targeting information records which may include compensation for predetermined variables, such as field or game conditions, without requiring expensive, complicated or multi-step processes.

These as well as other features of the invention will become apparent from the detailed description which follows, considered together with the appended drawings.

SUMMARY OF THE INVENTION

In accordance with the present invention, an inexpensive temporary or permanent record of targeting information related to the accuracy of aiming a simulated weapon or gaming device with respect to a target, including compensation for field conditions, is created by printing a visible target and a series of targeting information messages offset therefrom to simulate the field condition or conditions, masking the targeting information messages with a thermal clearing masking layer and applying an intense visible light to a portion of the thermal clearing masking layer by aiming the simulated weapon or gaming device at the visible target. The intense light illuminating the portion of the target area is converted to heat by the thermal clearing masking layer, and/or the ink used to print the target and/or targeting information messages, to render that portion of the thermal clearing masking layer transparent to reveal the target and/or appropriate targeting information message therethrough.

In another aspect, the present invention provides a recording target including a target substrate having a record image, a thermal clearing masking layer on the substrate masking the record image, and IR converting means for converting intense visible light applied to the target into infrared radiation to reveal the record image through the thermal clearing masking layer.

In another aspect, the present invention provides a targeting information recording system having a target substrate including a record image, a thermal clearing masking layer on the substrate masking the record image, strobe means for applying intense visible light to the thermal clearing masking layer in a targeting relationship to the target substrate and IR converting means for converting the applied intense visible light into infrared radiation to reveal the record image through the thermal clearing masking layer.

In a further aspect, the present invention provides a method of determining and recording target information by displaying a record image on a target substrate, masking the record image with a thermal clearing masking layer on the substrate, and converting intense visible light applied to the thermal clearing layer into infrared radiation to reveal the record image through the thermal clearing masking layer.

In a still further aspect, the present invention provides a method for recording targeting information by displaying a record image on a target substrate, masking the record image with a thermal clearing masking layer on the substrate, applying intense visible light to the thermal clearing masking layer in a targeting relationship to the target substrate and converting the intense visible light applied into infrared radiation to reveal the record image through the thermal clearing masking layer.

In yet another aspect, the applied intense visible light may be converted to infrared radiation by the thermal clearing masking layer alone, the record image there below alone or a combination of both the thermal clearing masking layer and the record image. The portion of the record image revealed through the heated portion of the thermal clearing masking layer may be revealed therethrough on a permanent basis to form a permanent record or the portion of the record image revealed through the thermal clearing masking layer may be revealed therethrough on a temporary basis so that when the thermal clearing masking layer is rendered opaque again, by cooling, the lapse of sufficient time or an applied electric field, that portion of the record image is no longer revealed therethrough.

BRIEF DESCRIPTION OF THE DRAWINGS

A preferred embodiment and alternative embodiments of the present invention are shown in and by the following drawings in which like reference numerals indicate like parts and in which.

DETAILED DESCRIPTION OF THE PREFERRED EMBODIMENTS

Figure 1:
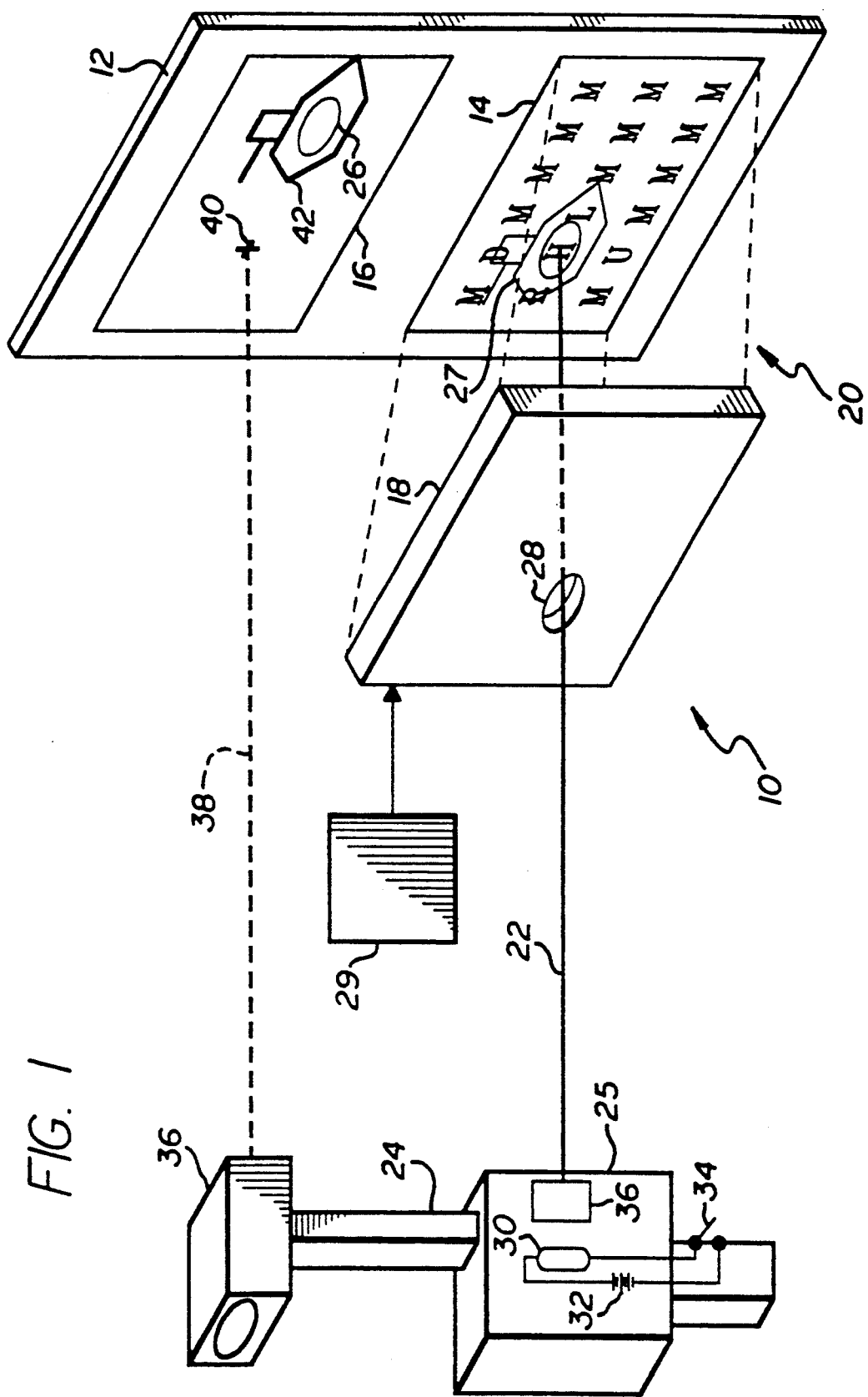
FIG. 1 is a isometric diagram of a recording target system according to the present invention in which the target is shown in an exploded view for clarity.

FIG. 1 is an isometric diagram of targeting information system 10 including target substrate 12 on which is positioned target record image 14 and visual target image 16. Substrate 12 may conveniently be an inexpensive substrate, such as paper or cardboard, while target record image 14 may conveniently be a printed image.

Visual target image 16 may be displayed in an appropriate field of view by any conventional imaging process, convenient for the application of targeting information system 10. In accordance with the presently preferred embodiment of the invention shown in FIG. 1, visual target image 16 is applied by a conventional printing process directly on target substrate 12.

Figures 2, 3:
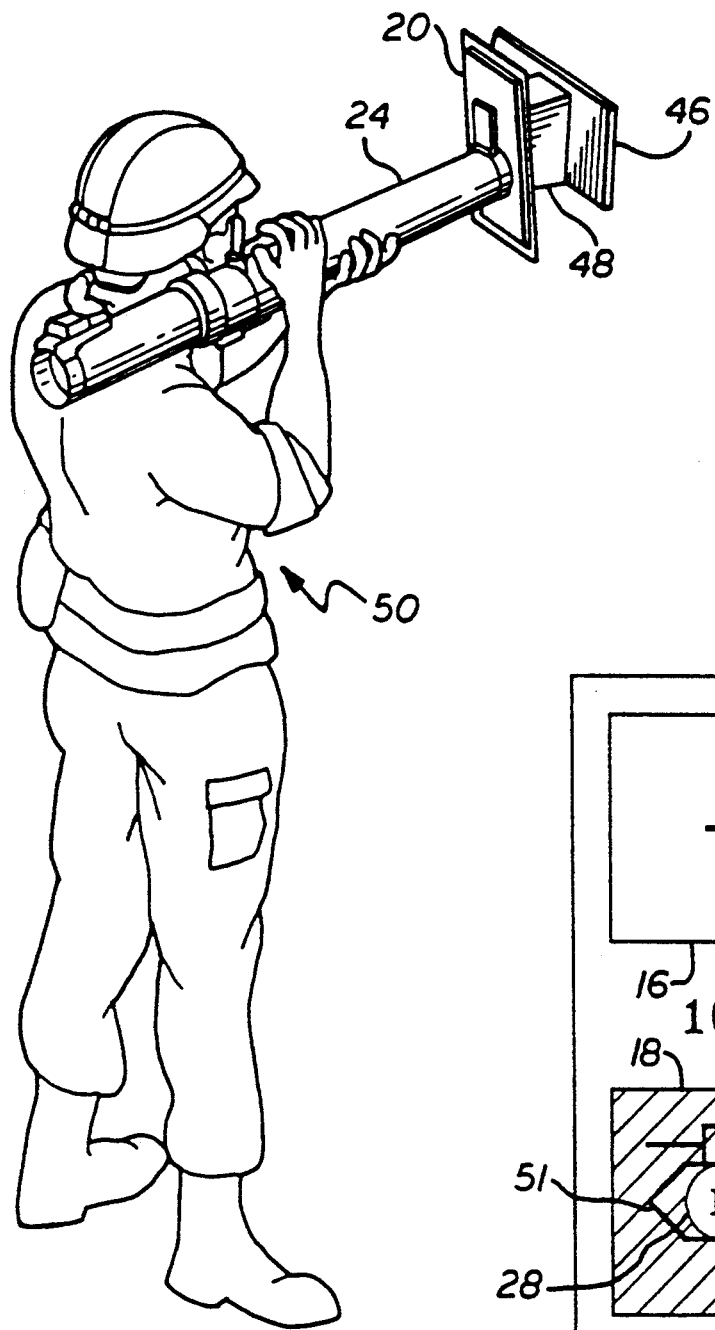
FIG. 2 is a front view of the recording target shown in FIG. 1.
FIG. 3 is an isometric illustration of a recording target system in accordance with the present invention in use by an operator.

Thermal clearing masking layer 18 is superimposed directly on target record image 14, as shown in FIG. 2. For clarity, masking layer 18 is shown displaced in front of target record image 14 in FIG. 1. Thermal clearing masking layer 18 is formed from a material which masks or obscures target record image 14 from view before use, but reveals portions of target record image 14 where modified by heat. Portions of target record image 14 are revealed or become visible through thermal clearing masking layer 18 by melting, evaporating or otherwise rendering at least a portion of thermal clearing masking layer 18 transparent, or by otherwise modifying thermal clearing masking layer 18 in response to IR radiation to indicate message information related to the portion of target record image 14 related thereto.

In a preferred embodiment, thermal clearing masking layer 18 may conveniently be formed as a layer of material, such as a liquid crystal material, which is sufficiently opaque under normal lighting conditions to hide target record image 14 from view but is rendered able to reveal at least a portion of record image 14 in areas heated by IR radiation. In the presently preferred embodiment of the present invention, the portion of thermal clearing masking layer 18 heated by IR radiation is rendered sufficiently transparent by such heating to reveal the portion of target record image 14 there below.

A convenient material for use as thermal clearing masking layer 18 is a liquid crystal material, such as the conventional temperature sensing materials which change their color characteristics in response to temperature changes. Such temperature sensitive liquid crystal materials typically capture or give up an ion, such as an FE ion, to change color or become transparent at particular temperatures. An especially convenient liquid crystal material of this type is the CHROMICOLOR UV SCREEN INK available from MATSUI SHIKISO CHEMICAL CO., LTD. of Kyoto, Japan and/or MATSUI AND COMPANY, INC. of N.J.

According to the above noted sources, CHROMICOLOR UV SCREEN INK is a UV-curing type ink which may be applied by silk screen printing, using a polyester mono-filament large screen mesh, onto paper and other suitable substrate materials, such as polyester or hard vinyl chloride. The printed image may then be cured for about 2 to 10 seconds using conventional mercury vapor irradiation equipment. A printed film of CHROMICOLOR UV SCREEN INK is said to lack lustre and be low in water-resistance and friction strength, but may be protected by lamination with an over layer of transparent film such as polypropylene or polyester. CHROMICOLOR UV SCREEN INK in microencapsulated form is combined in a ratio of one to three with denatured alcohol acid ester oligomer resin which includes a light polymerization initiator.

Liquid crystal material need only be used for the portion of the thermal clearing masking layer through which the portion of the target is to be made visible. If desired, the remainder of the thermal clearing masking layer may be made of material which appears under normal conditions to be the same as the liquid crystal material but is not necessarily rendered transparent by IR radiation. For example, an area of the thermal clearing masking layer may be formed of liquid crystal material of a particular color while the surrounding area is formed of ink or other material of the same color. In particular, portions of the printed target may include areas of the same color as the liquid crystal material so that less of the liquid crystal material is required while the entire area remains masked or at least obscured in that the liquid crystal material is not distinguishable from its background on the target because the colors are the same.

In accordance with the presently preferred embodiment, thermal clearing masking layer 18 is formed of a 75 micron thick layer of CHROMICOLOR UV SCREEN INK applied over target record image 14 printed on target substrate 12. In some applications, target record image 14 may be formed of an ink which converts applied intense visible light into infrared radiation, such as a high carbon black content ink. In other applications, target record image 14 need not be formed of a material which converts visible light into infrared radiation. Depending upon the application, the converted IR radiation used to reveal the portion of target record image 14 through thermal clearing masking layer 18 is converted from a burst or pulse of intense visible light, applied to thermal clearing masking layer 18, by the IR converting properties of thermal clearing masking layer 18, such as the FE or similar ions in liquid crystal material, or by the IR converting properties of target record image 14, such as the high carbon black ink used for printing the image, or by the IR converting properties of both thermal clearing masking layer 18 and target record image 14.

The combination of target record image 14 on target substrate 12, at least partially hidden from view by thermal clearing masking layer 18, forms target 20 which may conveniently include visual target image 16 printed or displayed thereon. In FIG. 1, thermal clearing masking layer 18 is shown in an exploded view displaced from target substrate 12, but in normal operation target 20 is configured with thermal clearing masking layer 18 positioned directly upon target substrate 12.

In operation of targeting information system 10 to record targeting information on target 20, targeting beam 22 is applied by training weapon 24 to strike thermal clearing masking layer 18. Targeting beam 20 includes a pulse of intense visible light, such as a pulse from a Xenon strobe, which illuminates a specific portion of thermal clearing masking layer 18 to reveal a portion of target record image 14, such as on-target zone 26. The portion of target record image 14 revealed by targeting beam 22 is made visible by the conversion of the received visible illumination into IR radiation which renders targeted portion 28 of thermal clearing masking layer 18 transparent. The IR converting properties of thermal clearing masking layer 18, or of target record image 14, or both, may be used to convert the intense visible light applied to targeted portion 28 into IR radiation applied to thermal clearing masking layer 18. That is, the intense light is applied to layer 18 and converted to heat by reaction with an IR converter, such as high carbon content ink, metallic ions in the liquid crystal masking layer, and/or a combination of both sources of converted IR radiation. Before the application of targeting beam 22, targeted portion 28 is merely an undifferentiated portion of the layer. As noted above, thermal clearing masking layer 18 is rendered transparent by converted IR radiation so that targeted portion 28 is created by the heating converted from illumination of target record image 14 by visible light. A portion of target record image 14 is thereby made visible through targeted portion 28 when targeted portion 28 is rendered transparent created by heat applied to thermal clearing masking layer 18. The applied heat results from the conversion of visible radiation to infrared radiation.

In FIG. 1, the major portion of thermal clearing masking layer 18 is shown in a cross-hatched manner to indicate that it is not transparent, while targeted portion 28 of thermal clearing masking layer 18 is shown without such cross-hatching to indicate that it is in fact transparent. Targeted portion 28 does not necessarily represent a physical hole through thermal clearing masking layer 18.

If targeting beam 22 was accurately applied to on-target zone 26 so that the targeted portion 28 of the layer rendered transparent is the portion of thermal clearing masking layer 18 superimposed above on-target zone 27, then any image such as a targeting record positioned within on-target zone 27 in target record image 14 will be revealed through targeted portion 28. Target 20, with targeted portion 28 of thermal clearing masking layer 18 rendered sufficiently transparent to reveal a portion of target record image 14, becomes a record of the portion of target record image 14 illuminated by targeting beam 22 even though target record image 14 was not visible to the operator of training weapon 24 before targeting beam 22 was applied.

In particular, as shown in FIG. 1, on-target zone 27 in target record image 14 includes information indicating a successful targeting operation or hit in that the image of the letter "H" is rendered visible through thermal clearing masking layer 18 as shown in FIG. 2 when targeting beam 22 is applied to target 20 to strike on-target zone 27.

If desired, alternate messages may be revealed or displayed if targeting beam 22 is not accurately applied to thermal clearing masking layer 18 For example, if targeting beam 22 is applied above on-target zone 27, the image revealed by IR heating of thermal clearing masking layer 18 may indicate a near miss and even the direction of the required targeting error correction by revealing, for example, the image of the letter "D" which may represent the information that the required correction is "DOWN".

Similarly, strikes to the left, right and/or below the desired on-target zone 27 may reveal messages such as the letters "R", "L" and/or "U" representing the error correction messages "RIGHT", "LEFT", and/or "UP". In addition, a complete miss may be indicated, for example, by the letter "M" revealed by targeted portion 28 or a winning message such "$2" may be displayed when targeting information system 10 is utilized for gaming.

Alternatively, the color properties of thermal clearing masking layer 18 may be used for recording and/or displaying appropriate messages or information as a result of the desired targeting. For example, an outline silhouette, such as outline 51, may be applied in a contrasting color on the visible surface of thermal clearing masking layer 18 directly above on-target zone 27 to serve the same functions in applications in which it would not be detrimental to permit operator 50 to see outline 51. In particular, outline 51 would not be present in a system in which security was a paramount issue.

Target 20 may be used as a permanent or temporary record depending upon the characteristics of thermal clearing masking layer 18. If the material used for thermal clearing masking layer 18 returns to opacity at ambient temperature, then over time the record of targeting information will disappear. The period of time may be shortened by cooling thermal clearing masking layer 18 to the temperature at which opacity returns. Alternatively, or in addition, another mechanism may be employed to return thermal clearing masking layer 18 to opacity. For example, certain liquid crystal materials may be reset by the application of an appropriate electrical field so that, after illumination of the target to reveal the targeting information, an electric field may then be used to prepare thermal clearing masking layer 18 for reuse by rendering the layer entirely opaque.

In particular, record reset device 29 is connected to thermal clearing masking layer 18 to apply an electric field thereto, and/or reduce the temperature thereof, in order to selectively make target 20 a reusable or temporary record. If target 20 is used as a permanent record, record reset device 29 is not required.

Targeting beam 22 is produced in training weapon 24 by illumination from controllable light source 25, such as xenon strobe 30 connected to battery 32 by operation of trigger switch 34, and applied to target 20 through an appropriate beam shaping or focussing device such as lens or aperture 36. Alternatively, a triggerable, collimated light source such as a laser may be used.

Targeting beam 22 is applied to the position on thermal clearing masking layer 18 corresponding to the position of visual target image 16 in the field of view of sight 36 which may be any convenient sighting device appropriate for the application of targeting information system 10 such as a telescopic sight, peep sight or ranging sight.

Line of sight 38 from sight 36 of training weapon 24 to sighting point 40 on target 20 is shown for clarity as a dotted line. As shown in FIGS. 1 and 2, sighting point 40 may be required to be displaced from the target displayed in visual target image 16, such as tank 42, in order to record a hit. In other words, in order to strike on-target image 26 of tank 42, it is necessary to aim a point such as sighting point 40 displaced therefrom. The required displacement or lead between on-target zone 26 and tank 42, that is, the offset between on-target image 27 and on-target record zone 26 necessary to score a hit may depend on target and weapon field conditions such as wind, elevation, target speed and etc.

One of the principal advantages of the present invention is that target record image 14 may be printed so that the targeting information recorded thereon, which is hidden from the view of operator of training weapon 24 until trigger switch 34 is activated, includes a controllable displacement from the visual target image 16 provided to the operator. Although in a simple version of the invention this displacement or leading may be eliminated, or outline 51 applied on the visible surface of thermal clearing masking layer 18, the ability to include displacement or leading requirements vastly improves the value and effectiveness of targeting information system 10 when used for training or gaming.

For example, a particular target 20, such as the one shown in FIG. 2, may indicate on its face that it is for a particular type of target, such as tank 42, under particular field conditions, such as the tank at a distance of 100 meters proceeding forward at a speed indicated as slow. Sighting point 40 is shown in FIG. 2 for convenience, but would not normally be recorded on target 20. It is the point on visual target image 16 that the operator must aim at in order to record a hit.

The operator of training weapon 24 must sight the target with the appropriate lead so that a real projectile, if fired, would reach a point coincident with the target when it reaches the range of the target. A different target 20, in which there was no required displacement between on-target zone 26 and sighting point 40 would be used for the same tank target for a non-moving tank at a close distance. Similarly, even for a target with no forward motion, if the distance to the target was sufficient that the trajectory of the projectile was curved, sighting point 40 would have to be above on-target zone 26 on visual target image 16.

Since sighting point 40 would not normally be indicated on visual target image 16, except perhaps during a pre-training or post-training session, targeting information system 10 is suitable for training and testing the ability of the operator of training weapon 24 to apply a suitable correction displacement or leading required to compensate for the described field and weapon conditions. In other words, targeting information system 10 is useful for testing the operator's ability to accurately aim in front of a moving target and/or above a distant target.

Another substantial advantage of the present invention is that target 20, whether or not visual target image 16 is permanently displayed thereon, may conveniently be an instantly available permanent record of the targeting information from a particular training session. The operator of training weapon 24 not only may view the accuracy of the targeting including the targeting displacement correction, but the record including any desired instructions or other printed information such as target title block 44 may conveniently be maintained to track changes in accuracy. The size, shape and location on target 20 of the revealed targeted information is controlled by the size and shape the portion of targeting beam 22 which is applied to thermal clearing masking layer 18 to form targeted portion 28.

A further substantial advantage of the present invention is related to ease and convenience of use. In conventional weapons training or other targeting record imaging systems, live ammunition must be used to properly assess the operator's skills in applying correction factors for leading, trajectory adjustments and etc. In addition to the cost and danger, such conventional systems require substantial preparation and physical expanse. In accordance with the present invention, at least portions of such training and testing may conveniently be conducted in simple, undemanding environments, such as classrooms.

In particular, target 20 may be mounted on wall mountable bracket 46 by flexible bracket 48 so that target 20 may be positioned on any wall surface at a convenient height for operator 50. Target 20 is attached to flexible bracket 48 by any appropriate conventional means, such as clips, not shown. Because bracket 48 is flexible, operator 50 may push training weapon 24 directly against target 20 and have target 20 automatically aligned properly with the end of training weapon 24, for example, in perpendicularly thereto. Since target 20 includes visual target image 16 separated from target record image 14 on target substrate 12, the parallax between sight 36 and controllable light source 25, which takes the place of the barrel or other working portion of training weapon 24, is maintained.

In this way, the range between operator 50 and tank 42 may be physically only the length of training weapon 24 while target 20 accurately simulates the effects on sighting of predetermined effective range conditions there between. In other words, operator 50 can push training weapon 24 directly against target 20 and still perceive tank 42 as if it were the same distance away from the operator as would be appropriate in the field. The various relationships possible between on-target zone 26, the hit, miss and other information to be rendered visible in targeted portion 28 by the application of targeting beam 22 may therefore be used to simulate a wide variety of field conditions including target distance, motion and wind conditions, while operator 50 is standing in a convenient testing center perhaps with many other operators.

Although the invention has been described in terms of preferred embodiments thereof, other embodiments that are apparent to those of ordinary skill in the art are also within the scope of the invention. Accordingly, the scope of the invention is intended to be defined only by reference to the appended claims.

What is claimed is:

1. A recording target comprising:
   a target substrate including a record image;
   a thermal clearing masking layer on said substrate masking said record image; and
   IR converting means for converting intense visible light applied to said thermal clearing masking layer into infrared radiation to reveal said record image through said thermal clearing masking layer.

2. The invention of claim 1, wherein said record image further comprises:
   a targeting information record printed on said substrate.

3. The invention of claim 1 wherein said IR converting means further comprises:
   ink printed on said substrate to form said record image.

4. The invention of claim 1 wherein said IR converting means further comprises:
   means within said thermal clearing masking layer for converting intense visible light to IR radiation.

5. The invention of claim 1, wherein said target substrate further comprises:
   a visible target image located in a predetermined relationship to said record image so that intense visible light applied to said layer in a desired targeting relationship to said visible target image reveals at least a portion of said record image.

6. The invention of claim 5, further comprising:
   ink printed on said substrate to form said record image and said visible target image.

7. The invention of claim 5, wherein said record image further comprises:
   an on-target message; and
   a plurality of additional messages surrounding said on-target message so that intense visible light applied in said desired targeting relationship reveals said on-target message while intense visible light applied with an aiming offset departure from said desired targeting relationship reveals one of said plurality of additional messages.

8. The invention of claim 5, wherein said record image further comprises:
   one or more game winning messages.

9. The invention of claim 7, wherein each of said plurality of additional messages further comprises:
   record data related to an off-target offset between each said additional message and said on-target message so that intense visible light applied with a particular aiming offset reveals record data related to said particular aiming offset.

10. The invention of claim 5, wherein said record image further comprises:
    an on-target message having a field condition offset from said target image so that said desired targeting relationship must include an aiming compensation for said field condition offset in order to reveal said portion of said record image.

11. The invention of claim 10, wherein said record image further comprises:
    a plurality of additional messages surrounding said on-target message so that intense visible light applied to said substrate with an aiming offset from said desired targeting relationship reveals one of said plurality of additional messages.

12. The invention of claim 11, wherein each of said plurality of additional messages further comprises:
    record data related to an off-target offset between said additional message and said on-target message so that intense visible light applied to said substrate with a first aiming offset from said desired targeting relationship to said target image reveals record data related to said first aiming offset.

13. A targeting information recording system comprising:
    a target substrate including a record image;
    a thermal clearing masking layer on said substrate masking said record image;
    strobe means for applying intense visible light to said thermal clearing masking layer in a targeting relationship to said target substrate; and
    IR converting means for converting intense visible light applied to said thermal clearing masking layer into infrared radiation to reveal said record image through said layer.

14. The invention of claim 13, wherein said record image further comprises:
    a targeting information record printed on said substrate.

15. The invention of claim 13 wherein said IR converting means further comprises:
    ink printed on said substrate to form said record image.

16. The invention of claim 13 wherein said IR converting means further comprises:
    material within said thermal clearing masking layer.

17. The invention of claim 13, wherein said target substrate further comprises:
    a visible target image located in a predetermined relationship to said record image;
    sighting means for aiming at a point of aim in the vicinity of said visible image; and
    means for controlling said strobe means to apply said intense visible light to said layer at a location fixed with regard to said point of aim, whereby at least a portion of said record image is revealed through said layer when said point of aim has a predetermined desired targeting relationship to said visible target image.

18. The invention of claim 17, further comprising:
    ink printed on said substrate to form said record image and said visible target image.

19. The invention of claim 17, wherein said record image further comprises:
a plurality of game winning messages selectively revealed when said point of aim has said predetermined desired targeting relationship with said visible target.

20. The invention of claim 17, wherein said record image further comprises:
an on-target message; and
a plurality of additional messages surrounding said on-target message, whereby said on-target message is revealed when said point of aim has said predetermined desired targeting relationship with said visible target and one of said additional messages is revealed when said point of aim includes an undesired aiming offset departure from said predetermined desired targeting relationship.

21. The invention of claim 20, wherein each of said plurality of additional messages further comprises:
data related to a particular undesired aiming offset so that data related to said undesired aiming offset is revealed when said point of aim departs from said predetermined desired targeting relationship by said particular undesired aiming offset.

22. The invention of claim 17, wherein said record image further comprises:
an on-target message having a field condition offset from said target image so that said desired targeting relationship must include an aiming compensation for said field condition offset in order to reveal said portion of said record image.

23. The invention of claim 22, wherein said record image further comprises:
a plurality of additional messages surrounding said on-target message so that intense visible light applied to said substrate with an aiming offset from said desired targeting relationship reveals one of said plurality of additional messages.

24. The invention of claim 23, wherein each of said plurality of additional messages further comprises:
record data related to an off-target offset between said additional message and said on-target message so that intense visible light applied to said substrate with a first aiming offset from said desired targeting relationship to said target image reveals record data related to said first aiming offset.

25. A method of determining and recording target information comprising the steps of:
forming a record image on a target substrate;
masking said record image with a thermal clearing masking layer on said substrate; and
converting intense visible light applied to said thermal clearing masking layer into infrared radiation to reveal said record image through said thermal clearing masking layer.

26. The invention of claim 25, wherein the step of forming said record image further comprises the step of:
printing said record image on said substrate.

27. The invention of claim 25 wherein said record image is formed of ink printed on said substrate which converts said intense visible light into IR radiation.

28. The invention of claim 25 wherein said step of converting intense visible light further comprises the step of:
converting intense visible light applied to said thermal clearing masking layer into IR radiation in said thermal clearing masking layer.

29. The invention of claim 25, further comprising the step of:
forming a visible target image in a predetermined relationship to said record image so that intense visible light applied to said layer in a desired targeting relationship to said visible target image reveals at least a portion of said record image.

30. The invention of claim 29, further comprising:
printing said record image and said visible target image on said substrate in ink which responds to intense visible light by emitting infrared radiation.

31. The invention of claim 29, wherein said step of forming a record image further comprises the steps of:
forming an on-target message; and
forming a plurality of adjacent additional messages so that intense visible light applied in said desired targeting relationship reveals said on-target message while intense visible light applied with an aiming offset departure from said desired targeting relationship reveals one of said plurality of additional messages.

32. The invention of claim 31, wherein said step of forming a plurality of adjacent additional messages further comprises the step of:
forming record data in each said additional image related to an off-target offset between each said additional message and said on-target message so that intense visible light applied with a particular aiming offset reveals record data related to said particular aiming offset.

33. The invention of claim 29, wherein step of forming said record image further comprises the step of:
offsetting said on-target message from said target image in accordance with a simulated field condition so that said desired targeting relationship must include an aiming compensation for said field condition offset in order to reveal said portion of said record image.

34. The invention of claim 33, wherein said step of forming said record image further comprises the step of:
surrounding said on-target message with a plurality of additional messages so that intense visible light applied to said substrate with an aiming offset from said desired targeting relationship reveals one of said plurality of additional messages.

35. The invention of claim 34, wherein the step of surrounding said on-target message further comprises the step of:
forming record data in each said message related to an off-target offset between said additional message and said on-target message so that intense visible light applied to said substrate with a first aiming offset from said desired targeting relationship to said target image reveals record data related to said first aiming offset.

36. A method for recording targeting information comprising the steps of:
forming a record image on a target substrate;
masking said record image with a thermal clearing masking layer on said substrate;
applying intense visible light to said thermal clearing masking layer in a targeting relationship to said target substrate; and
converting said intense visible light into infrared radiation to reveal said record image through said layer.

37. The invention of claim 36, wherein said step of forming said record image further comprises the step of:

printing a targeting information record on said substrate.

38. The invention of claim 36 wherein said converting step further comprises:
forming said record image from ink printed on said substrate.

39. The invention of claim 36, further comprising the steps of:
displaying a visible target image in a predetermined relationship to said record image;
providing a sighting device for aiming at a point of aim in the vicinity of said visible image; and
applying said intense visible light to said layer at a location fixed with regard to said point of aim, whereby at least a portion of said record image is revealed through said layer when said point of aim has a predetermined desired targeting relationship to said visible target image.

40. The invention of claim 39, further comprising the steps of:
forming said record and visible target images in ink printed on said substrate.

41. The invention of claim 36, wherein said step of forming said record image further comprises the steps of:
forming an on-target message; and
surrounding said on-target message with a plurality of additional messages, whereby said on-target message is revealed when said point of aim has said predetermined desired targeting relationship with said visible target and one of said additional messages is revealed when said point of aim includes an undesired aiming offset departure from said predetermined desired targeting relationship.

42. The invention of claim 41, wherein the step of surrounding said on-target message further comprises the step of:
forming said additional messages with data related to a particular undesired aiming offset so that data related to said undesired aiming offset is revealed when said point of aim departs from said predetermined desired targeting relationship by said particular undesired aiming offset.

43. The invention of claim 39, wherein said step of forming said record image further comprises the step of:
offsetting said on-target message from said target image with a field condition offset so that said desired targeting relationship must include an aiming compensation for said field condition offset in order to reveal said portion of said record image.

44. The invention of claim 43, wherein said step of forming said record image further comprises the step of:
surrounding said on-target message with a plurality of additional messages so that intense visible light applied to said substrate with an aiming offset from said desired targeting relationship reveals one of said plurality of additional messages.

45. The invention of claim 44, wherein each of said plurality of additional messages includes data related to an off-target offset between said additional message and said on-target message so that intense visible light applied to said substrate with a first aiming offset from said desired targeting relationship to said target image reveals record data related to said first aiming offset.

46. The invention of claim 36, further comprising the subsequent step of:
obscuring the revealed record image.

47. The invention of claim 46, wherein the step of obscuring the revealed record image further comprises the step of:
rendering the thermal clearing masking layer opaque.

48. The invention of claim 47, wherein the step of obscuring the revealed record image further comprises the step of:
cooling the thermal clearing masking layer to a temperature at which the layer becomes entirely opaque.

49. The invention of claim 47, wherein the step of obscuring the revealed record image further comprises the step of:
allowing the thermal clearing masking layer to cool to a temperature at which the layer becomes entirely opaque.

50. The invention of claim 47, wherein the step of obscuring the revealed record image further comprises the step of:
applying an electric field to the thermal clearing masking layer to render the layer entirely opaque.

* * * * *